United States Patent
Ling et al.

(10) Patent No.: US 6,786,440 B2
(45) Date of Patent: Sep. 7, 2004

(54) CONTAINER FOR BLENDER

(76) Inventors: Kuo-I Ling, 9F, No. 12, Alley 31, Lane 105, Sec. 2, Chung Hsiao Rd., San Chorng City, Taipei Hsien (TW); Rong-Yuan Tseng, 10F, No. 3, Lane 65, Sec. 2, Chung Hsiao Rd., San Chorng City, Taipei Hsien (TW)

( * ) Notice: Subject to any disclaimer, the term of this patent is extended or adjusted under 35 U.S.C. 154(b) by 275 days.

(21) Appl. No.: 10/173,399

(22) Filed: Jun. 18, 2002

(65) Prior Publication Data

US 2003/0230658 A1 Dec. 18, 2003

(51) Int. Cl.$^7$ ............................................. A47J 43/046
(52) U.S. Cl. ................. 241/301; 241/282.1; 241/285.1; 366/279; 366/341
(58) Field of Search .................. 366/279–291, 366/341; 241/282.1, 282.2, 285.1, 291, 301; D7/153, 154

(56) References Cited

U.S. PATENT DOCUMENTS 2,899,140 A * 8/1959 Hellyer ........................ 241/190
4,588,136 A * 5/1986 Homma ........................ 241/95

* cited by examiner

Primary Examiner—Mark Rosenbaum
(74) Attorney, Agent, or Firm—Rosenberg, Klein & Lee

(57) ABSTRACT

A container for blender includes a cup and a stainless steel hollow cylindrical member. The cylindrical member has an L-shaped upper rim and an annular bottom having an L-shaped inner edge. The cylindrical member is integrally fitted in a lower part of the cup when the latter is injection-molded with the L-shaped upper rim and the L-shaped inner edge of the annular bottom imbedded in peripheral wall and bottom wall of the cup, respectively. The cylindrical member protects the cup against direct contacting with and colliding by rigid materials being crushed in the cup, and accordingly eliminates tiny chips of the cup that would otherwise be produced due to such colliding.

2 Claims, 4 Drawing Sheets

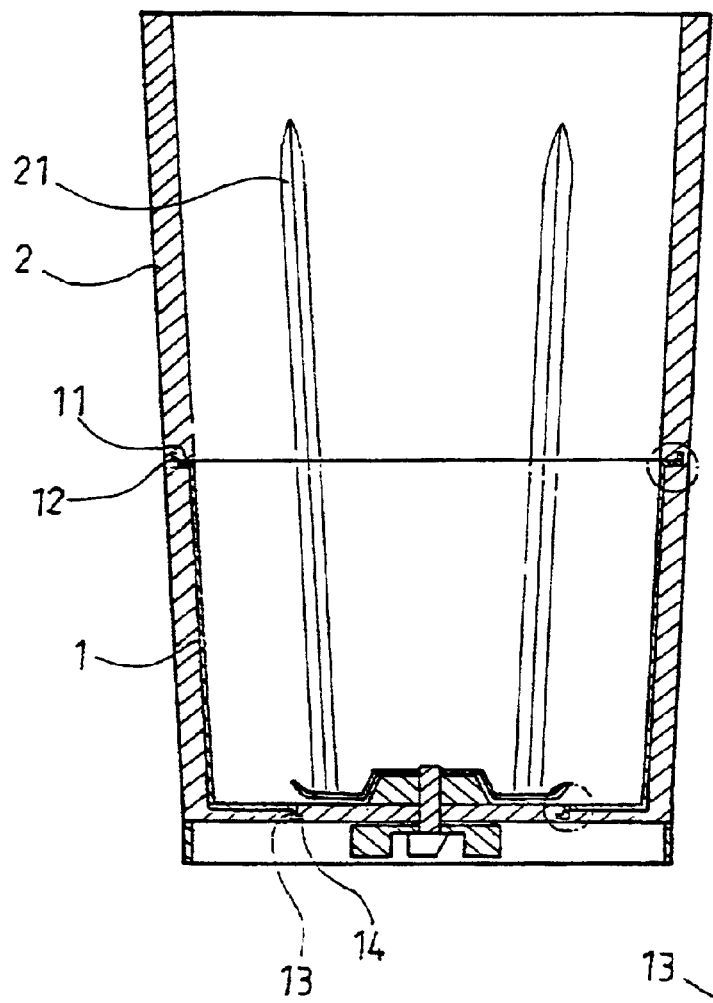
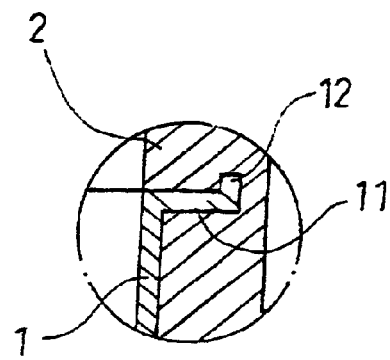
FIG.3A
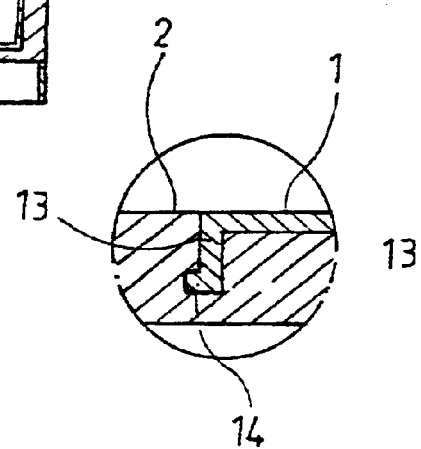
FIG.3  FIG.3B

CONTAINER FOR BLENDER

BACKGROUND OF THE INVENTION

The present invention relates to a container for blender, and more particularly to a container for blender that includes a cylindrical member fitted in a cup to prevent rigid materials being crushed in the cup from directly colliding with the cup to produce tiny chips of the cup.

A conventional container for blender is usually made of transparent glass or acrylic material. In the case of a glass container, it is heavy and fragile and is not so welcome by consumers. Most commercially available blenders have an acrylic container. Due to a physical property of the acrylic material, the acrylic container tends to be collided by rigid materials, such as ice cubes, nuts, etc., that are being crushed with the blender. Tiny chips of the container are produced due to such collision and are blended with the crushed materials to form harms to human body. Meanwhile, the acrylic container subjected to such collision becomes frosted after being used over a long period of time.

The container for blender is usually provided on an inner wall surface with ribs that enable producing of turbulent flows in the container when the blender is crushing and mixing different materials, so that the materials are more easily crushed. However, the ribs are also subjected to the collision by rigid materials being crushed and are gradually worn out to lose their function of producing turbulent flows in the blender. Chips of the worn-out ribs are also blended with the crushed materials and taken into the human body, forming harms to human body.

It has been tried to make the container with a metal material, such as stainless steel. However, the metal container has drawbacks of high manufacturing cost and being opaque. A user is not able to freely observe contents and conditions of materials in the container of the blender. Moreover, there are difficulties in overcoming limitations in shaping metal containers. The metal containers for blenders are therefore not widely welcomed by consumers, either.

It is therefore desirable to solve the problems long existing in the conventional container for blender.

SUMMARY OF THE INVENTION

A primary object of the present invention is to provide an improved container for blender that does not produce tiny chips of the container due to direct collision of crushed rigid materials with the container.

To achieve the above and other objects, the container for blender according to the present invention mainly includes a cup and a stainless steel hollow cylindrical member. The cylindrical member has an L-shaped upper rim including a radially outward extended horizontal portion and a vertical portion axially upward extended from an outer end of the horizontal portion, and an annular bottom having an L-shaped inner edge including an axially downward extended vertical portion and a horizontal portion radially inward extended from a lower end of the vertical portion. The cylindrical member is integrally fitted in a lower part of the cup when the latter is injection-molded with the L-shaped upper rim and the L-shaped inner edge of the annular bottom imbedded in peripheral wall and bottom wall of the cup, respectively. The stainless steel cylindrical member protects the cup against directly contacting with and colliding by rigid materials being crushed in the cup, and accordingly eliminates tiny chips of the cup that would otherwise be produced due to such colliding to harm human body.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 3 is a sectioned side view of the container for blender of FIG. 1;

FIGS. 3A and 3B are partially enlarged views of FIG. 3; and

DETAILED DESCRIPTION OF THE PREFERRED EMBODIMENTS

Figure 1:
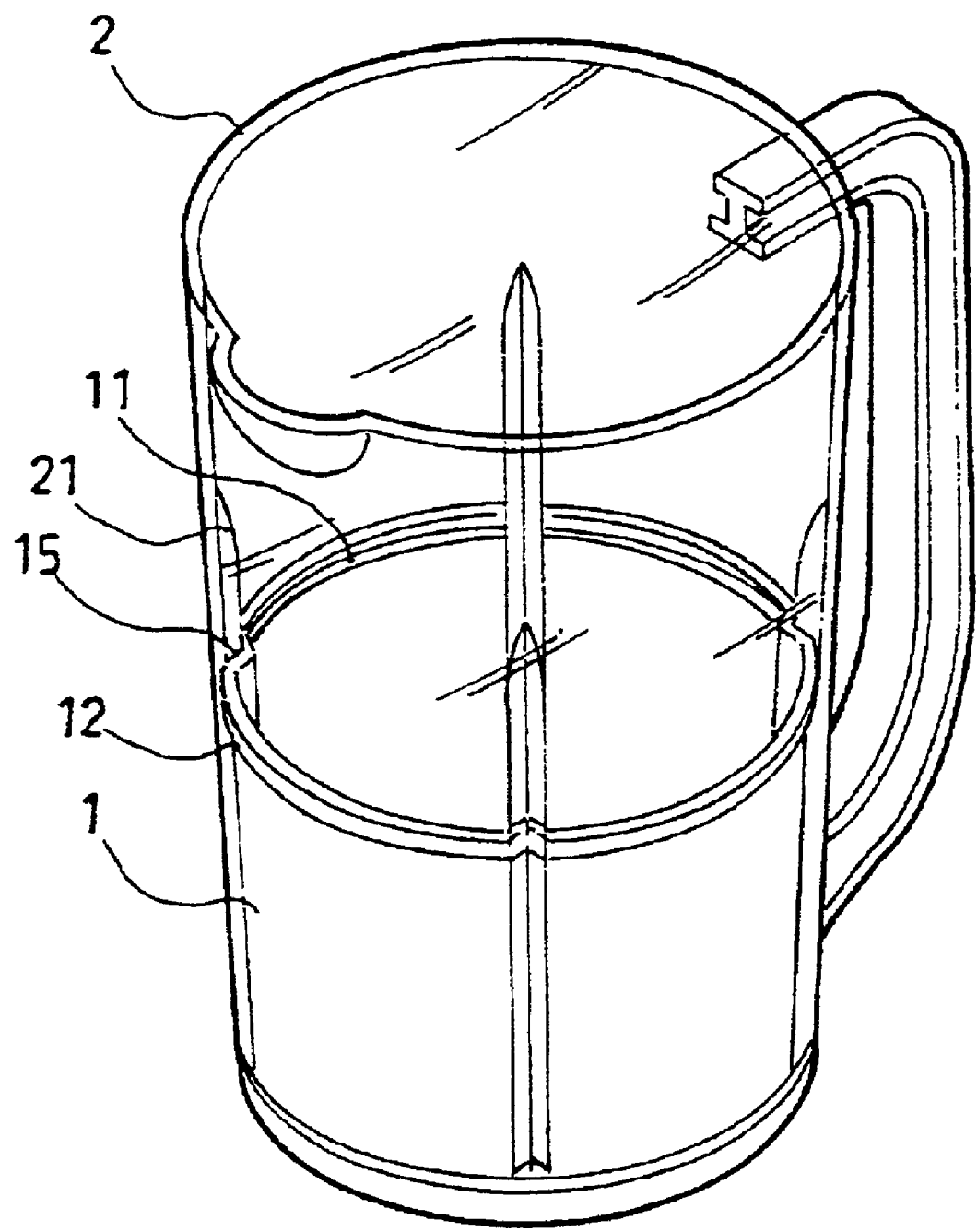
FIG. 1 is an assembled perspective view of a container for blender according to an embodiment of the present invention.
Figure 2:
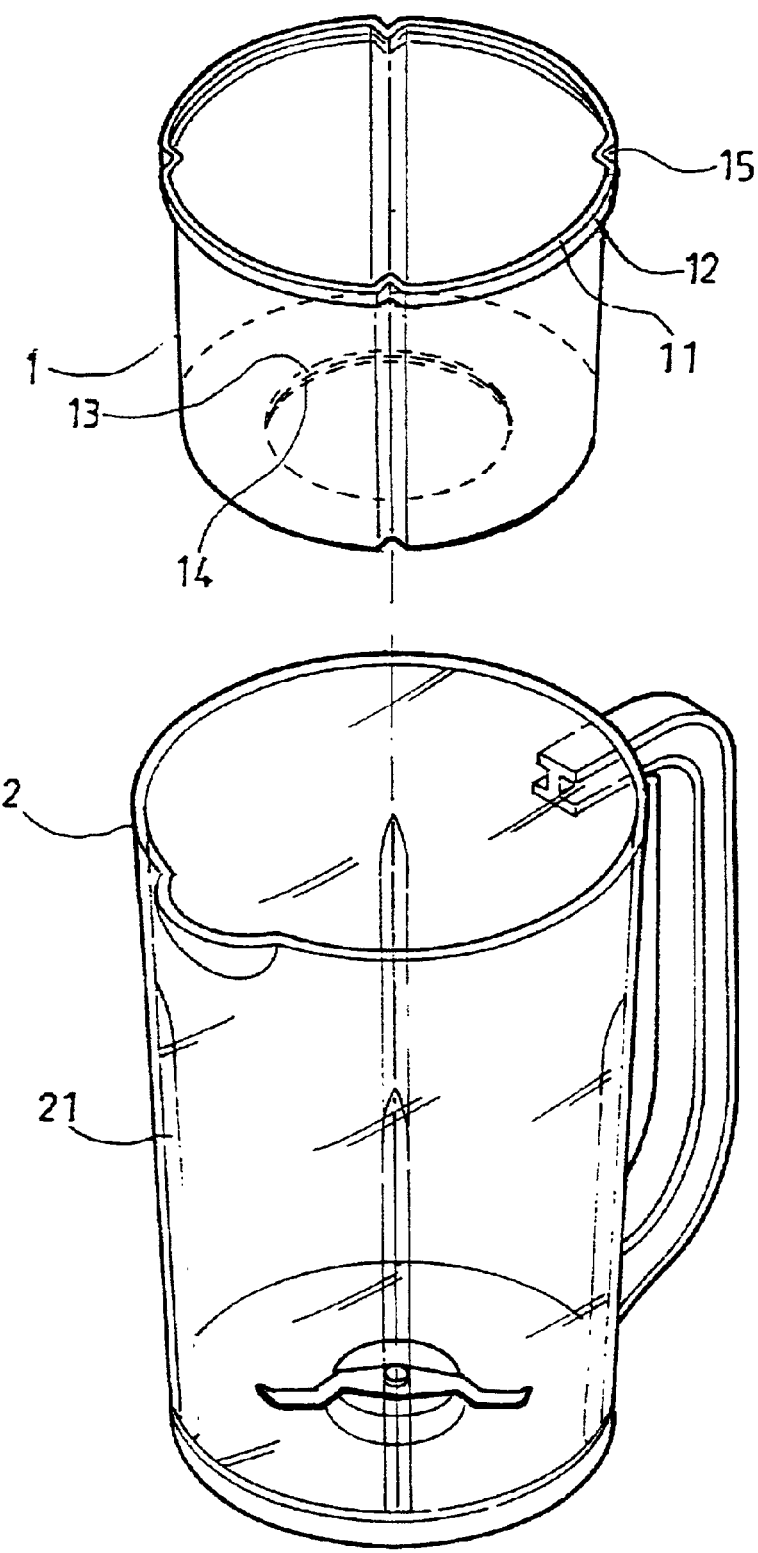
FIG. 2 is an exploded perspective view of the container for blender of FIG. 1.

Please refer to FIGS. 1 and 2 that are assembled and exploded perspective views, respectively, of a container for blender according to an embodiment of the present invention. As shown, the container of the present invention mainly includes an open-topped and open-bottomed hollow cylindrical member 1 made of a stainless steel material, and a big cup 2 made of, for example, a transparent plastic material.

The cylindrical member 1 has an L-shaped upper rim to include a radially outward extended horizontal portion 11, and a vertical portion 12 axially upward extended from an outer end of the horizontal portion 11, as can be best seen in FIG. 3A. The cylindrical member 1 includes a radially extended annular bottom defining a central opening that has an L-shaped inner edge including an axially downward extended vertical portion 13 and a horizontal portion 14 radially inward extended from a lower end of the vertical portion 13, as can be best seen in FIG. 3B. The cylindrical member 1 is provided on a peripheral wall with a plurality of circumferentially spaced and radially inward depressed grooves 15, such that a plurality of ribs having pointed ridges are formed on an inner side of the peripheral wall of the cylindrical member 1 corresponding to the grooves 15.

The cylindrical member 1 is integrally associated with the cup 2 when the latter is formed through injection molding, such that the cylindrical member 1 is located in a lower part of the cup 2 to fitly bear against an inner wall surface of the cup 2, as can be best seen in FIG. 3, with the grooves 15 of the cylindrical member 1 fitly engaging with axially extended ribs 21 provided on the inner wall surface of the cup 2, and the vertical portion 12 and the horizontal portion 14 at the upper rim and the annular bottom, respectively, of the cylindrical member 1 hooking to peripheral wall and bottom wall of the cup 2, as shown in FIGS. 3A and 3B, respectively.

With the above-described arrangements, the cylindrical member 1 is fitly attached to an inner lower part of the cup 2. When the blender is in use to crush rigid materials, the stainless steel cylindrical member 1 protects the plastic cup 2 against directly contacting with and colliding by the rigid materials. Therefore, no tiny chips of plastic cup 2 would be produced in the process of crushing rigid materials with the blender. Since the cylindrical member 2 is located in the lower part of the cup 2, it does not hinder a user from observing materials in the cup 2 at all.

Please refer to FIG. 3. The container for blender according to the present invention is manufactured by integrally associating the cylindrical member 1 with the cup 2 when the latter is injection-molded. In the completed container, the cylindrical member 2 is fitly attached to the inner side of the cup 2 with the L-shaped upper rim and the L-shaped inner edge of the annular bottom of the cylindrical member 1 completely imbedded in the peripheral wall and the bottom wall of the cup 2, respectively. That is, the upper rim and the bottom rim of the cylindrical member 2 are completely imbedded in the material forming the cup 2, enabling the cylindrical member 1 to firmly locate in the cup 2.

Figure 4:
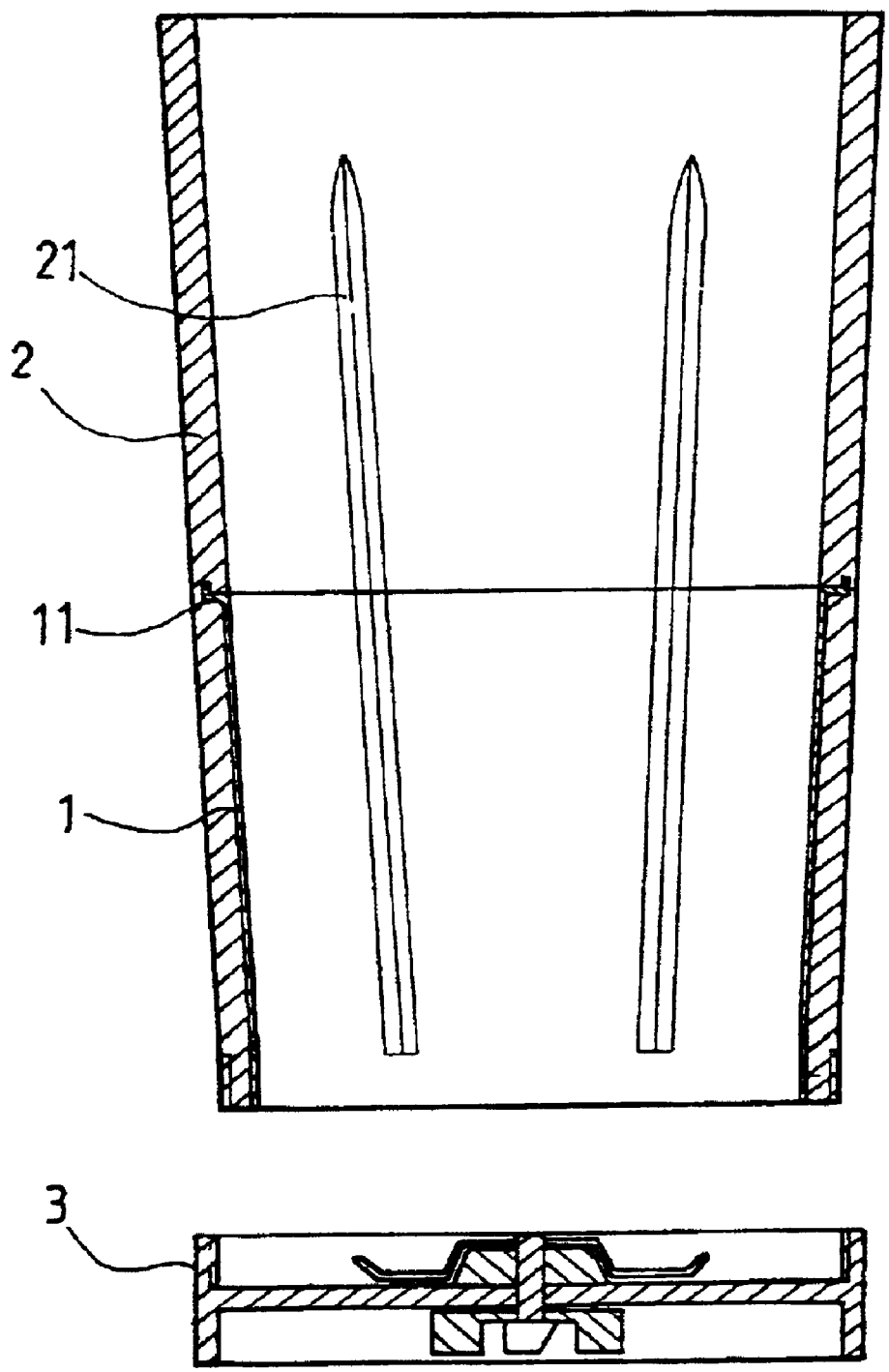
FIG. 4 is a sectioned side view of a container for blender according to another embodiment of the present invention.

FIG. 4 shows another embodiment of the present invention. In this embodiment, the container includes a cylindrical member 1 integrally associated with an open-bottomed cup body 2a, and a seat 3 removably connected to a bottom of the cup body 2a. With these arrangements, the cup body 2a is also protected by the cylindrical member 1 against direct collision by rigid materials being crushed with the blender.

What is claimed is:

1. A container for blender, comprising a hollow cylindrical member made of a stainless steel material, and a big cup made of a transparent plastic material;

said cylindrical member having an L-shaped upper rim to include a radially outward extended horizontal portion and a vertical portion axially upward extended from an outer end of said horizontal portion, and a radially extended annular bottom defining a central opening that has an L-shaped inner edge to include a downward extended vertical portion and a horizontal portion radially inward extended from a lower end of the vertical portion; and said cylindrical member being integrally associated with said cup when said cup is formed through injection molding, such that said cylindrical member is located in a lower part of said cup to fitly bear against an inner wall surface of said cup with said vertical portion and said horizontal portion at said upper rim and said annular bottom, respectively, of said cylindrical member imbedded in peripheral wall and bottom wall of said cup, respectively;

whereby said cylindrical member protects said cup against directly contacting with and colliding by rigid materials being crushed and blended in said cup, and accordingly eliminates tiny chips of said cup that would otherwise be produced due to such colliding.

2. The container for blender as claimed in claim 1, wherein said cylindrical member is provided on a peripheral wall with a plurality of circumferentially spaced and radially inward depressed grooves, such that a plurality of ribs having pointed ridges are formed on an inner side of said peripheral wall corresponding to said grooves; and wherein said grooves on said cylindrical member fitly engage with axially extended ribs provided on an inner wall surface of said cup when said cylindrical member is fitly located in the lower part of said cup.

* * * * *